United States Patent [19]

Joslin et al.

[11] Patent Number: 5,331,717
[45] Date of Patent: Jul. 26, 1994

[54] AUTOMATIC LOCKING MECHANISM FOR ENTRAINING CASTORWHEEL VEHICLES

[75] Inventors: Bradley D. Joslin, Meadville; Clarence M. Edwards, Jr., Erie, both of Pa.

[73] Assignee: American Sterilizer Company, Erie, Pa.

[21] Appl. No.: 2,748

[22] Filed: Jan. 11, 1993

[51] Int. Cl.⁵ .............................................. B60B 33/02
[52] U.S. Cl. ..................................................... 16/35 R
[58] Field of Search .............................. 16/35 R, 35 D

[56] References Cited

U.S. PATENT DOCUMENTS

| | | |
|---|---|---|
| 2,537,521 | 1/1951 | Forbes .................................. 16/35 R |
| 3,026,558 | 4/1958 | Mulholland ........................ 16/35 D |
| 3,075,233 | 1/1963 | Lorenz . |
| 3,098,257 | 7/1963 | Zaha . |
| 3,142,086 | 10/1964 | Thomas . |
| 3,861,702 | 1/1975 | Wilson ................................. 16/35 R |
| 3,974,542 | 8/1976 | Timmer et al. ..................... 16/35 R |
| 4,054,965 | 10/1977 | Vig et al. ............................ 16/35 D |
| 4,494,272 | 1/1985 | Morita ................................. 16/35 R |

Primary Examiner—Lowell A. Larson
Assistant Examiner—Donald M. Gurley
Attorney, Agent, or Firm—Jones, Day, Reavis & Pogue

[57] ABSTRACT

An improved mechanism is provided for enhancing the towability of castorwheel vehicles. The mechanism leaves the castors that are proximal to the towing force to rotate, while locking the distal castors in alignment with the vehicle axis.

5 Claims, 3 Drawing Sheets

AUTOMATIC LOCKING MECHANISM FOR ENTRAINING CASTORWHEEL VEHICLES

BACKGROUND OF THE INVENTION

This application relates to the art of entraining vehicles that move on castors so that trailing vehicles will follow the curvilinear path established by a towing force. The invention is particularly applicable to hospital carts and gurneys, although it will be appreciated that the invention has broader applicability to most types of castorwheel vehicles.

It is known in the art that for maximum stability and flexibility of towing, the lead wheels of any towed vehicle should be free to rotate, while the rear wheels should be locked in a straight orientation. Thus, various methods of manually locking castorwheels in a fixed position are known in the art. These methods do not readily lend themselves to entraining multiple vehicles, however, since they require manual intervention to lock and unlock the castors, at least at the individual vehicle level, and often at the level of each castorwheel.

Moreover, the methods employed for locking the castors in desired configurations frequently result in a restricted range of motion for the castors when the vehicle is returned to its primary use as a single unit. When operating alone, maximum maneuverability of each vehicle requires that all castorwheels be allowed to swivel through a full 360 degrees of motion.

Thus, it is desirable to have a locking mechanism that allows each castor of a vehicle, while operating alone, to swivel freely, through a 360 degree range of motion, yet automatically provides for appropriate locking of trailing castors when the vehicle is entrained. It is also desirable to be able to apply towing force from either end of a train of vehicles, with automatic interchange of the leading and trailing castor configuration.

SUMMARY OF THE INVENTION

The present invention provides a locking mechanism that overcomes the limitations of the prior art. The locking mechanism includes a slider, which, in its quiescent state, allows all the castors to freely swivel. Upon application of a towing force to either end of the slider, however, a set of slots moves into positive engagement with a key or protrusion on the shank of the castorwheel assemblies distal to the towing force, thereby locking them in a straight orientation. Alternatively, the distal castorwheel assemblies may be the moveable members, which slide into positive engagement with fixed slots in response to a towing force. The proximal set of castors remains free to swivel.

In a preferred embodiment, a centering means normally maintains the slider in its quiescent position. All the castor shanks remain free to rotate 360 degrees through the circular portion of keyhole-shaped voids in the slider. When a towing force exceeds the centering force, the slider moves in the direction of the towing force. This movement causes the slotted portion of the keyhole shaped voids in the slider to mesh with corresponding keys on the shanks of the distal castorwheel assemblies. The proximal castorwheel shanks remain in the circular portion of the keyhole-shaped voids, remaining free to rotate.

DESCRIPTION OF PREFERRED EMBODIMENT

Figures 1, 1A:
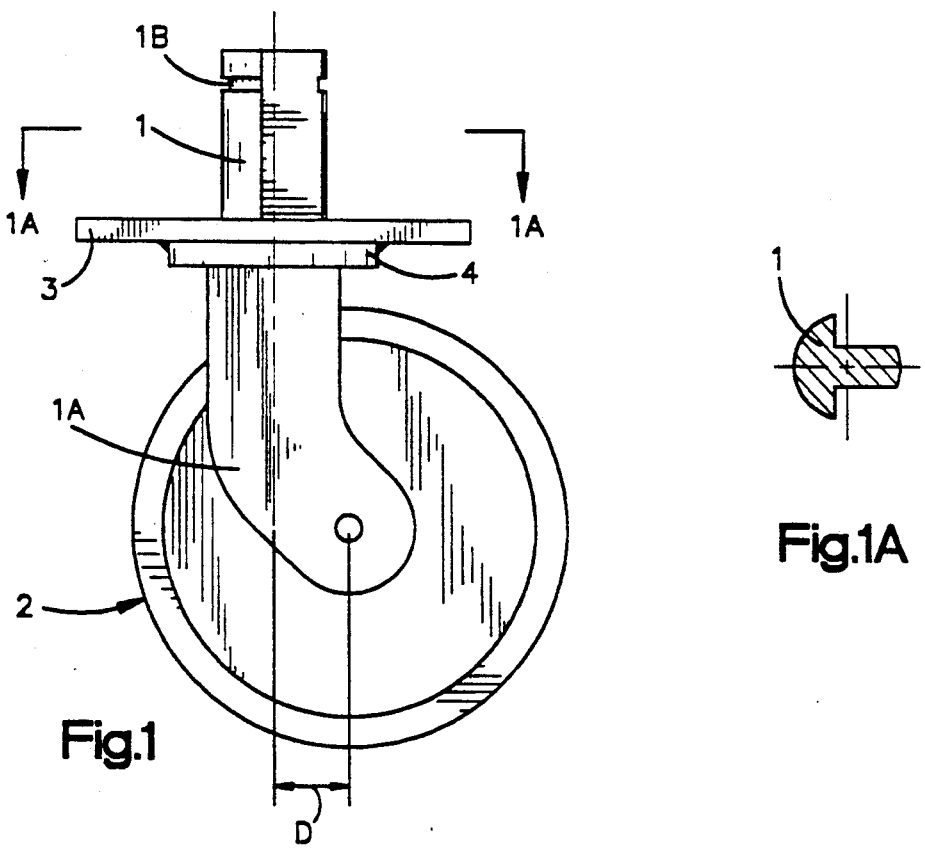
FIG. 1 is a side view of the castorwheel assembly.
FIG. 1A is a sectional view of the shank taken along line 1A—1A of FIG. 1.

The castorwheel assembly, as shown in FIG. 1, consists of a castor or wheel 2 attached to a forked member with "L" shaped tynes 1A attached to a shank 1 that extends through a bearing housing 4, which is welded to a mounting plate 3. A bearing (not shown) may be fitted over the shank below the mounting plate 3. The shank 1 has a cross section that resembles a mushroom head and stem, as shown in FIG. 1A. In the embodiment shown, the shank 1 also has a snap ring groove 1B, which may be employed to restrict any vertical displacement of the slider. The rotational axis of the shank 1 is offset by a distance D from the center of the wheel 2.

Figure 2:
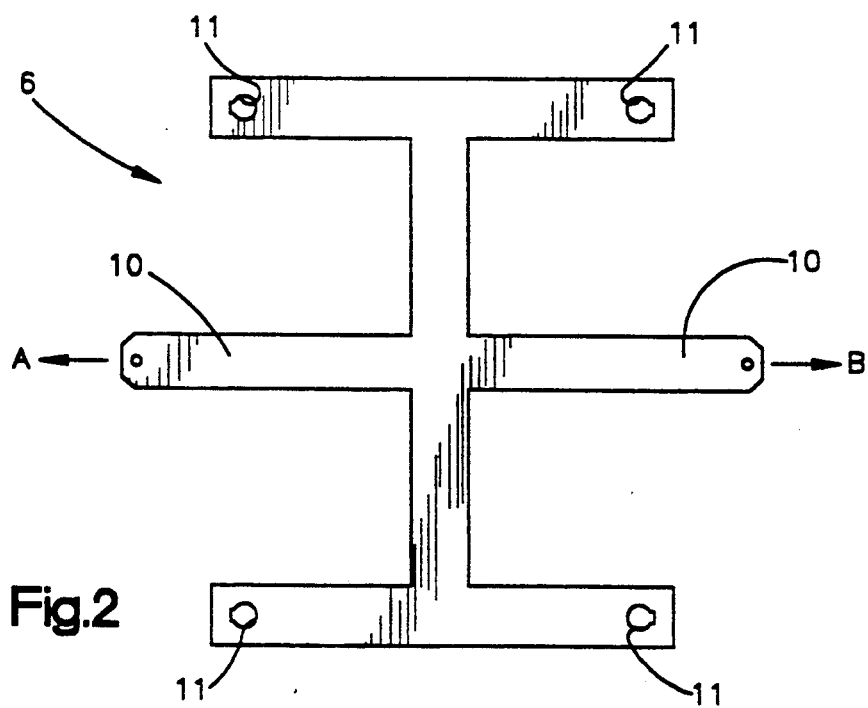
FIG. 2 is an overhead view of the slider.

FIG. 2 shows one embodiment of the slider. In this embodiment, the slider is an "H" shaped plate 6 with a towing bar 10 that extends outwardly in both directions from the horizontal cross member. Located in each corner of the "H" shaped plate is a keyhole-shaped void 11 with the slotted portions pointing outward toward the ends of the "H" shaped member. The diameter of the circular portion of the keyhole exceeds the cross-sectional diameter of the castorwheel shank 1.

Figure 3:
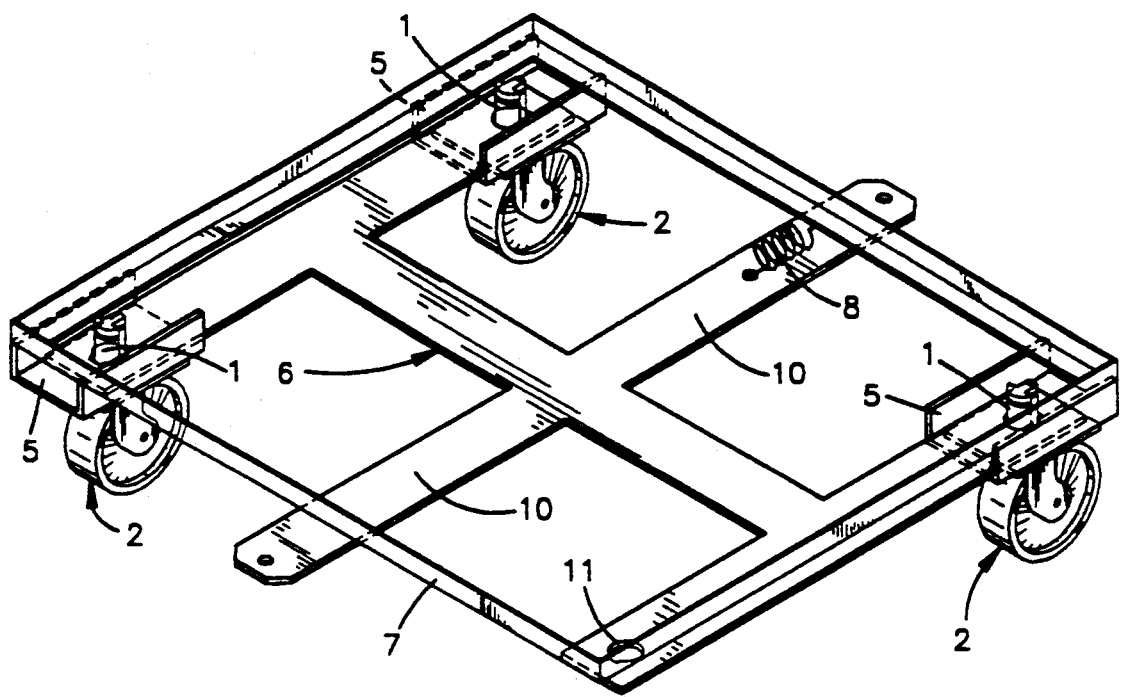
FIG. 3 is an exploded view showing the interconnective and spatial relationships of the slider, castorwheel assembly and vehicle frame.

FIG. 3 shows the relationship of the several components of the locking mechanism. Attached to the underside of the frame of the vehicle 7 are four channel members 5, to which the castorwheel assemblies are attached, with the shank 1 protruding through holes in the channel and through the keyhole-shaped voids 11 in the slider 6. The slider then moves longitudinally in the channel members in response to a towing force.

Figure 4:
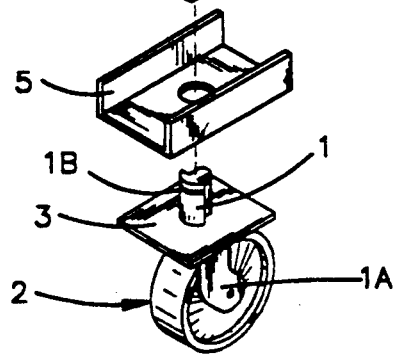
FIG. 4 shows the engagement of the slider and castor shanks in the towing mode.
Figure 4:
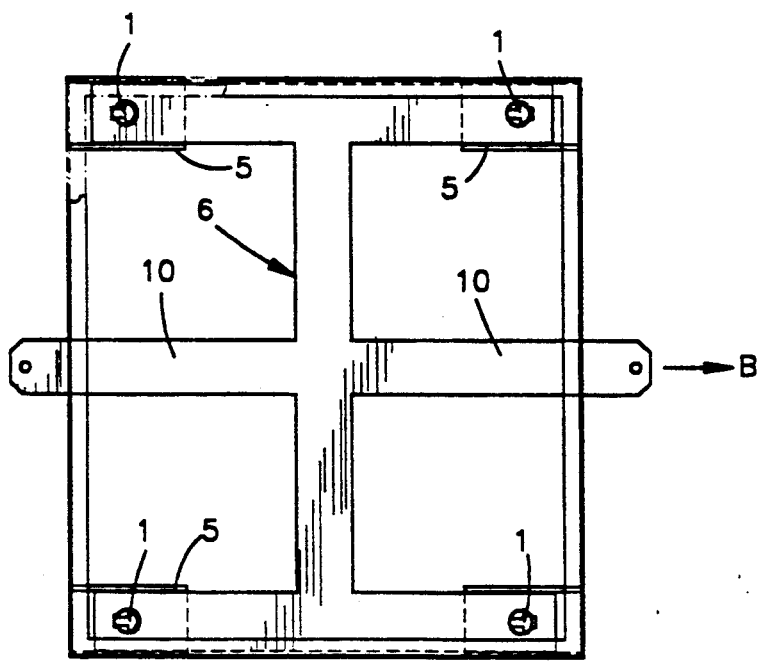

FIG. 4 shows the locking mechanism in the towing mode. When a towing force in excess of the centering force is applied to one end of the towing bar 10, the slider moves in the direction B of the towing force. Because of the eccentricity or offset in the mounting of the castorwheels, each castor pivots so as to align itself with the towing force. The shanks of the proximal castorwheels remain in the oversized circular portion of the keyhole-shaped voids in the slider and, hence, remain free to swivel in response to a change in the direction of the towing force. The shanks of the distal castorwheels, however, rotate into engagement with the advancing slotted portion of the corresponding keyhole-shaped voids, locking the castorwheels in alignment with the longitudinal axis of the vehicle, until the towing force is removed.

Those skilled in the art will appreciate that there are obvious variations suggested by the disclosure. A second set of orthogonally located slots could be provided in the keyhole shaped voids to afford directional stability when maneuvering a vehicle perpendicularly to the initial direction of towing. Furthermore, while a centering means, such as a centering spring 8, is provided in the preferred embodiment, this feature is not central to the disclosure. In particular applications, it may be more advantageous to rely on external force to restore the slider to its quiescent position. Moreover, it would be a simple matter to arrange for the slider or locking member to move into and out of engagement with the castorwheel shank in a vertical plane, perpendicular to the direction of towing.

It would also be a simple matter to alter the locking mechanism so that the castorwheels are normally locked, and made free to rotate by the application of an external force. In the preferred embodiment, this alteration could be accomplished either by reversing the orientation of the keyhole-shaped voids, or by biasing the slider so that it normally engages the castorwheel shanks.

Figure 5A:
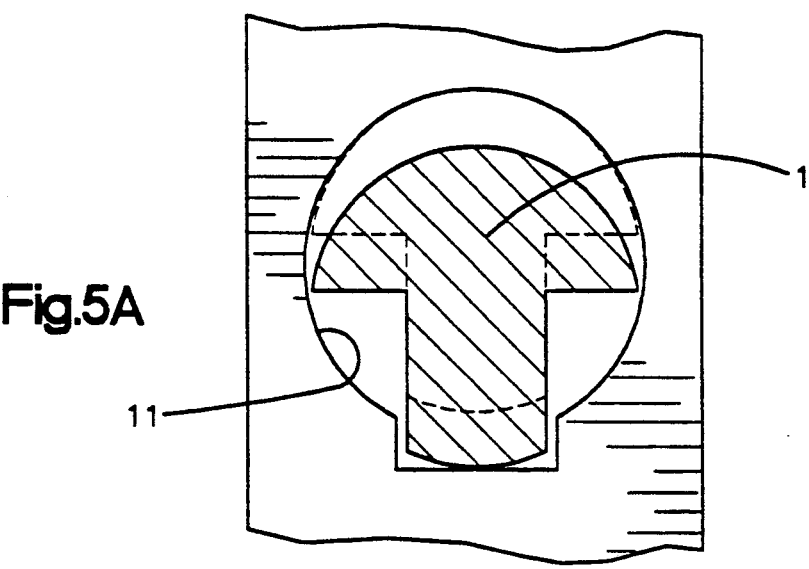
FIG. 5A, 5B and 5C shows alternative embodiments of the slider voids and shank cross-sections.
Figure 5B:
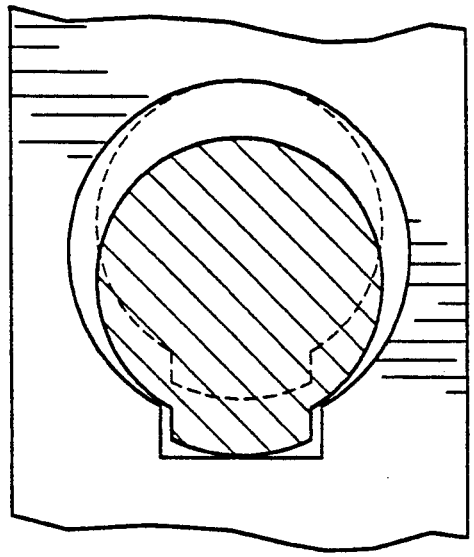
Figure 5C:
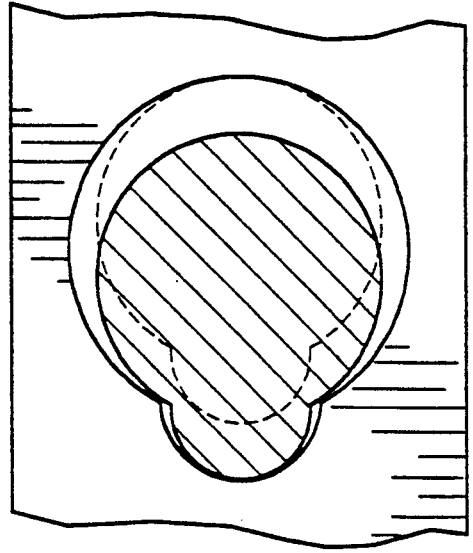

FIG. 5 shows alternate configurations of the castorwheel shank cross-section and slider voids that are also within the scope of this disclosure. FIG. 5A shows the configuration of the preferred embodiment. FIG. 5B shows an alternative configuration wherein the cross-section of the shank is basically circular with the keyed portion superimposed on the outer diameter. FIG. 5C shows a second alternative "Shmoo" configuration wherein the shank cross-section and the slider voids are both large circles with a smaller circular sector superimposed on the outside diameter of the large circle. It will be appreciated that FIGS. 5B and 5C do not exhaust the variations made possible by this disclosure, but are merely representative examples. Another obvious class of variations would be to have an indentation in the shank that mates with a protrusion in the slider.

The foregoing description of a preferred embodiment and alternative embodiments of the invention have been presented for purposes of illustration an description. The description is not intended to be exhaustive or to limit the invention to the precise form disclosed. Obviously, many modifications and variations are possible in light of the above teaching. The embodiment presented above was chosen and described in order to best explain the principles of the invention and its practical application to thereby enable others skilled in the art to best utilize the invention in various embodiments and with various modifications as are suited to the particular use contemplated.

We claim:

1. An automatic locking mechanism for entraining castorwheel vehicles comprising:
   a) a vehicle frame;
   b) a plurality of castorwheels swivably mounted to said vehicle frame such that the castorwheels are normally free to swivably rotate about a substantially vertical axis;
   c) a locking member mounted on said vehicle frame responsive to an external force applied to said locking member at either end of said vehicle for locking the castorwheels that are distal to the intended direction of motion of said castorwheel vehicle against swiveling; and
   d) a means for returning said locking member to a quiescent state upon removal of the external force.

2. An automatic locking mechanism, as described in claim 1, which further comprises:
   a) a plurality of castorwheel shanks, portions of said shanks having non-circular cross sections;
   b) said locking member having mating surfaces to the non-circular cross-sectional portions of said shanks, which, in response to the application of an external force applied to said locking member at either end of said vehicle, engages the castorwheel shanks that are distal to the intended direction of motion of said castorwheel vehicle locking said distal castorwheels against swiveling.

3. An automatic locking mechanism, as described in claim 2, which further comprises:
   a) a plurality of castorwheels swivably mounted to said vehicle frame having the vertical axis of said castorwheels shanks offset from the center of said castorwheels, such that said castorwheels tend to swivel into alignment with the direction of movement of said castorwheel vehicle; and
   b) a locking member slidably mounted to said vehicle frame, that in response to an external force applied to said locking member at either end of said vehicle slides into positive engagement with the castorwheel shanks distal to the direction of motion of said castorwheel vehicle, locking said distal castorwheels against swiveling, while leaving the proximal castorwheels free to swivel into alignment with the direction of movement of said castorwheel vehicle.

4. An automatic locking mechanism, as described in claim 1, further comprising:
   a) a plurality of castorwheel shanks, portions of said shanks having non-circular cross-sections;
   b) said locking member having mating surfaces to the non-circular cross-sectional portions of said shanks, which is normally maintained in positive engagement with said shanks; and
   c) a means for disengaging said locking member in response to an external force.

5. An automatic locking mechanism, as described in claim 1 or 2, which further comprising:
   a) an "H" shaped slider having a tow bar attached thereto and slidably mounted on said vehicle frame, which slides in the direction of a towing surface applied to said tow bar at either end of said vehicle, with keyhole shaped voids having a circular and a slotted portion located in each extremity of said slider, with the slotted portions of said keyhole shaped voids pointing outward from the centerline of said castorwheel vehicle;
   b) a plurality of castorwheel shanks, portions of which have non-circular cross-sections that normally rotate in the circular portion of said keyhole shaped voids allowing said castorwheels to swivel, but having a protrusion that engages the slotted portion of said keyhole shaped voids as said slider slides in response to an external force, thereby locking the castorwheels distal to the external force against swiveling.

* * * * *